(12) United States Patent
Zhao et al.

(10) Patent No.: US 12,303,063 B2
(45) Date of Patent: May 20, 2025

(54) BEVERAGE-MAKING MACHINE

(71) Applicant: Hamilton Beach Brands, Inc., Glen Allen, VA (US)

(72) Inventors: Jie Zhao, Midlothian, VA (US); Adam Hanes, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 1086 days.

(21) Appl. No.: 17/219,214

(22) Filed: Mar. 31, 2021

(65) Prior Publication Data

US 2022/0183502 A1 Jun. 16, 2022

Related U.S. Application Data

(63) Continuation-in-part of application No. 17/119,516, filed on Dec. 11, 2020, now Pat. No. 12,096,881, and a continuation-in-part of application No. 17/119,540, filed on Dec. 11, 2020, now abandoned.

(51) Int. Cl.
| | |
|---|---|
| A47J 31/52 | (2006.01) |
| A23F 5/26 | (2006.01) |
| A47J 31/10 | (2006.01) |
| A47J 31/36 | (2006.01) |
| A47J 31/46 | (2006.01) |
| A47J 31/54 | (2006.01) |
| A47J 31/56 | (2006.01) |

(52) U.S. Cl.
CPC ............. *A47J 31/5255* (2018.08); *A23F 5/26* (2013.01); *A47J 31/10* (2013.01); *A47J 31/3676* (2013.01); *A47J 31/468* (2018.08); *A47J 31/5253* (2018.08); *A47J 31/545* (2013.01); *A47J 31/56* (2013.01); *A47J 2202/00* (2013.01); *A47J 2203/00* (2013.01)

(58) Field of Classification Search
CPC .. A47J 31/5255; A47J 31/5253; A47J 31/468; A47J 31/10; A47J 31/3676; A47J 31/545; A47J 31/56; A47J 2202/00; A47J 2203/00; A23F 5/26
See application file for complete search history.

(56) References Cited

U.S. PATENT DOCUMENTS

| | | |
|---|---|---|
| 5,168,794 A | 12/1992 | Glucksman |
| 5,207,148 A | 5/1993 | Anderson et al. |
| 5,893,822 A | 4/1999 | Deni et al. |
| 5,953,981 A | 9/1999 | Lassota |
| 6,606,938 B2 | 8/2003 | Taylor |
| 6,708,600 B2 | 3/2004 | Winkler et al. |

(Continued)

*Primary Examiner* — Elizabeth M Kerr
*Assistant Examiner* — Keith Brian Assante
(74) *Attorney, Agent, or Firm* — Alexander D. Raring

(57) ABSTRACT

A beverage-making machine includes: a housing; a fluid reservoir mounted to the housing; a pump fluidly connected with the water reservoir; a heating unit; and a brew station having an outlet; wherein the fluid reservoir, the pump, the heating unit and the brew station define a fluid path. The beverage-making machine further comprises a controller configured to:
(a) detect performance of a pre-brewing action, and in response initiate preheating of the heating unit; then
(b) detect performance of a brew activation action, and in response activate the pump to convey fluid from the fluid reservoir along the fluid path to the outlet of the brew station to prepare a brewed beverage.

19 Claims, 16 Drawing Sheets

(56) References Cited

U.S. PATENT DOCUMENTS

| | | | |
|---|---|---|---|
| 7,003,928 B2 | 2/2006 | Patterson et al. | |
| 7,017,472 B2 | 3/2006 | Grant et al. | |
| 7,024,983 B2 | 4/2006 | Grant et al. | |
| 7,047,870 B2 | 5/2006 | Gantt et al. | |
| 7,059,239 B2 | 6/2006 | Balkau | |
| 7,089,849 B2 | 8/2006 | Chen et al. | |
| D597,572 S | 8/2009 | Tsai | |
| 7,677,157 B2 | 3/2010 | Steiner et al. | |
| 7,677,158 B2 | 3/2010 | McDuffie et al. | |
| D633,118 S | 2/2011 | Beatty et al. | |
| 8,006,611 B2 | 8/2011 | Lin | |
| D689,726 S | 9/2013 | Romandy et al. | |
| D694,794 S | 12/2013 | Cumming | |
| D732,329 S | 6/2015 | Palemo et al. | |
| 9,066,623 B2 | 6/2015 | Lai et al. | |
| D738,149 S | 9/2015 | Ye | |
| D757,479 S | 5/2016 | Steiner | |
| 9,326,634 B1* | 5/2016 | Fedele | A47J 31/002 |
| D763,030 S | 8/2016 | Priley et al. | |
| 2005/0178799 A1* | 8/2005 | Cheong | A47J 31/401 |
| | | | 222/129.4 |
| 2005/0247205 A1 | 11/2005 | Chen et al. | |
| 2008/0115674 A1 | 5/2008 | Huang et al. | |
| 2010/0086653 A1* | 4/2010 | Fedele | A47J 31/002 |
| | | | 99/280 |
| 2010/0269703 A1 | 10/2010 | Lin | |
| 2013/0004629 A1 | 1/2013 | Clark et al. | |
| 2013/0095212 A1 | 4/2013 | Beer | |
| 2013/0164422 A1 | 6/2013 | McCormick et al. | |
| 2013/0236618 A1 | 9/2013 | Tinkler et al. | |
| 2014/0030404 A1 | 1/2014 | Sullivan et al. | |
| 2014/0037808 A1 | 2/2014 | Rizzuto et al. | |
| 2015/0335197 A1 | 11/2015 | Moon et al. | |
| 2016/0007797 A1 | 1/2016 | Lin | |
| 2016/0235246 A1* | 8/2016 | Beekman | A47J 31/4403 |
| 2017/0290458 A1* | 10/2017 | Burrows | A47J 31/3628 |
| 2018/0042258 A1* | 2/2018 | Roberts | A23B 70/00 |
| 2018/0325307 A1* | 11/2018 | Stasch | A47J 31/5255 |
| 2018/0332997 A1* | 11/2018 | Kang | A47J 31/525 |
| 2020/0288899 A1* | 9/2020 | Abu-Saymeh | A47J 31/18 |
| 2020/0397180 A1* | 12/2020 | Rabadi | A47J 31/3623 |

* cited by examiner

BEVERAGE-MAKING MACHINE

RELATED APPLICATION

The present application claims priority from and the benefit of U.S. patent application Ser. Nos. 17/119,540, filed Dec. 11, 2020, and 17/119,516, filed Dec. 11, 2020, the disclosure of which are hereby incorporated by reference herein in full.

FIELD OF THE INVENTION

The present invention relates generally to small appliances, and more specifically to beverage makers.

BACKGROUND

Automatic drip coffeemakers are well known and widely used. They are effective to brew carafes of coffee, typically containing five to eight cups or more of liquid. Automatic drip coffee makers may also be used for brewing small batches (one to four cups).

A typical automatic drip coffeemaker includes a brew basket that contains ground coffee (presented loosely in a bowl-shaped filter or within a "pod"-type package often referred to "K-Cups"). Heated water is conveyed to the brew basket and released, where it gravimetrically flows downwardly through the coffee grounds and into a receptacle such as a carafe or pot. Exemplary automatic drip coffeemakers are discussed in U.S. Pat. No. 5,001,969 to Moore et al.; U.S. Pat. No. 7,066,080 to Hsu; and U.S. Pat. No. 8,065,952 to Wang, the disclosures of which are hereby incorporated herein by reference in full. Some coffeemakers are designed to brew coffee in different forms; for example, coffeemakers offered in the FLEXBREW® line of products available from Hamilton Beach Brands (Richmond, Virginia) include an insert that enables the user to choose between a pod or loose ground coffee.

Moreover, another coffeemaker offered in the FLEXBREW® line of coffeemakers has two different "stations," one of which can brew a full pot or carafe, and the other of which brews a single serving (often utilizing a pod as described above). This coffeemaker can provide the user with the flexibility of brewing either a single serving, if that is all that is desired, or a multiple servings in a pot or carafe.

It may be desirable to provide performance improvements to coffeemakers.

SUMMARY

As a first aspect, embodiments of the invention are directed to a method of brewing a beverage with a beverage-making machine. The beverage-making machine comprises a housing, a controller, a fluid reservoir mounted to the housing, a pump fluidly connected with the water reservoir, a heating unit, a brew station having an outlet, and a fluid path defined by the fluid reservoir, the pump, the heating unit, and the brew station, the method comprising:
 (a) detecting, by the controller, a performance of a pre-brewing action;
 (b) initiating preheating of the heating unit responsive to the detection of the performance of the pre-brewing action;
 (c) detecting by the controller a performance of a brew activation action that is different from the pre-brewing action; and
 (d) passing fluid from the reservoir along the fluid path to the outlet of the brew station to prepare a brewed beverage responsive to detection of the performance of the brew activation action.

As a second aspect, embodiments of the invention are directed to a method of brewing a beverage with a beverage-making machine. The method comprises:
 (a) responsive to detection of a performance of a pre-brewing action by a controller of the beverage-making machine, initiating, by the controller, preheating of a heating unit of the beverage making-machine, wherein the pre-brewing action is selected from the group consisting of: selecting a brew strength; selecting a brew volume; manipulating a fluid reservoir; positioning a receptacle adjacent an outlet of a brew station; and manipulating the brew station to add brew solids, and wherein the heating unit is preheated to an equilibrium temperature of between about 50 and 90 degrees C.; then
 (b) responsive to detecting of a performance of a brew activation action that is different from the pre-brewing action, passing fluid from the fluid reservoir along a fluid path to the outlet of the brew station to brew the beverage.

As a third aspect, embodiments of the invention are directed to a beverage-making machine comprising: a housing; a fluid reservoir mounted to the housing; a pump fluidly connected with the water reservoir; a heating unit; and a brew station having an outlet; wherein the fluid reservoir, the pump, the heating unit and the brew station define a fluid path. The beverage-making machine further comprises a controller configured to:
 (a) detect performance of a pre-brewing action, and in response initiate preheating of the heating unit; then
 (b) detect performance of a brew activation action, and in response activate the pump to convey fluid from the fluid reservoir along the fluid path to the outlet of the brew station to prepare a brewed beverage.

As a fourth aspect, embodiments of the invention are directed to a method of determining whether fluid is present in a beverage-making machine. The method comprises the steps of:
 (a) operating a beverage-making machine comprising:
  a housing;
  a fluid reservoir mounted to the housing;
  a flow meter;
  a pump fluidly connected with the water reservoir;
  a heating unit; and
  a brew station having an outlet;
  wherein the fluid reservoir, the pump, flow meter, the heating unit and the brew station define a fluid path;
 (b) measuring the flow rate of fluid flowing through the flowmeter during step (a);
 (c) if the flow rate measurement of step (b) is below a first predetermined level, determining the level of an operational parameter of the pump;
 (d) if the operational parameter level of the pump determined in step
 (c) is above a second predetermined level, determining that the beverage-making machine requires replenishment of fluid in the reservoir; or
 (e) if the operational parameter level determined in step (c) is below the second predetermined level, determining that the beverage-making machine does not require replenishment.

As a fifth aspect, embodiments of the invention are directed to a method of determining whether fluid is present in a beverage-making machine comprising:
(a) measuring a flow rate of a fluid flowing through a flowmeter and comparing the measured flow rate of the fluid with a first pre-determined level;
(b) responsive to detecting that the measured flow is below the first predetermined level of about 1.0 ml/s, determining an operational parameter level of a pump and comparing the determined operational parameter level of the pump with a second predetermined level; and
(c) if the operational parameter level determined in step (b) is above the second predetermined level, determining that the beverage-making machine requires replenishment; or
(d) if the operational parameter level determined in step (b) is below the second predetermined level, determining that the beverage-making machine does not require replenishment.

As a sixth aspect, embodiments of the invention are directed to a beverage-making machine comprising: a housing; a fluid reservoir mounted to the housing; a flow meter; a pump fluidly connected with the water reservoir; a heating unit; and a brew station having an outlet; wherein the fluid reservoir, the pump, flow meter, the heating unit and the brew station define a fluid path. The beverage-making machine further comprises a controller configured to:
(a) receive measurements of the flow rate of fluid flowing through the flowmeter during operation of the beverage-making machine);
(b) if the flow rate measurement is below a first predetermined level, receive measurements of a level of an operational parameter of the pump; and
(c) if the operational parameter level of the pump is above a second predetermined level, determine that the beverage-making machine requires replenishment of fluid in the reservoir; or (d) if the operational parameter level of the pump is below the second predetermined level, determining that the beverage-making machine does not require replenishment.

DETAILED DESCRIPTION

Figure 1:
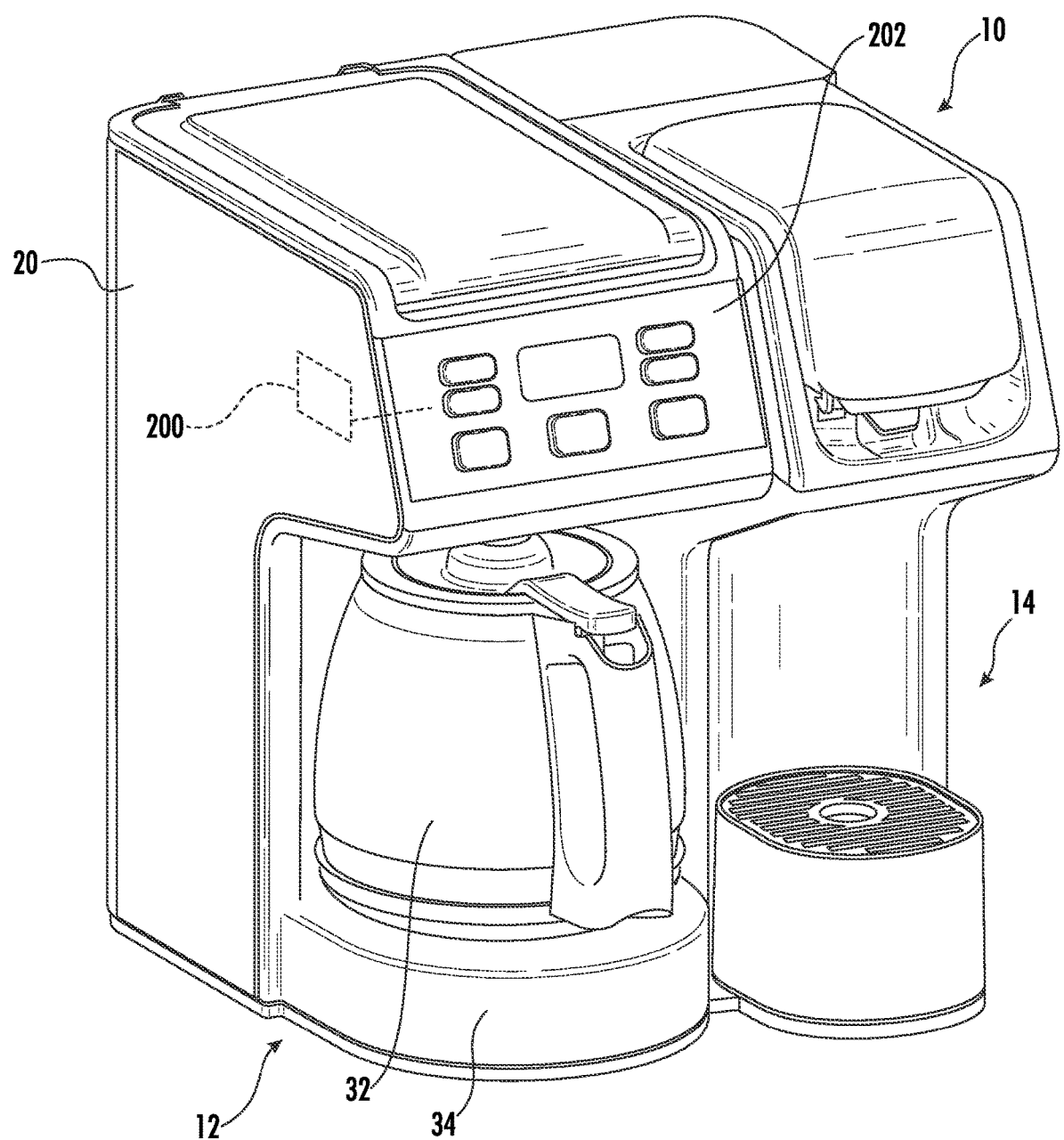
FIG. 1 is a front perspective view of a multi-functional coffeemaker according to embodiments of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the drawings, a multi-functional coffeemaker, designated broadly at 10, is shown in FIG. 1. The coffeemaker 10 has both a large serving station 12, which is configured to brew conventional coffee from either loose grounds or a pod, and a small serving station 14, which is configured to brew coffee from a pod. The large serving station 12 and the small serving station are activated via a control panel 202 that is operatively connected with a controller 200 that can control the operation of the coffeemaker 10. The coffeemaker 10 has an overall housing 20 that covers the exterior of the device. The large serving and small serving stations 12, 14 are positioned in the front part of the housing 20.

Figure 2:
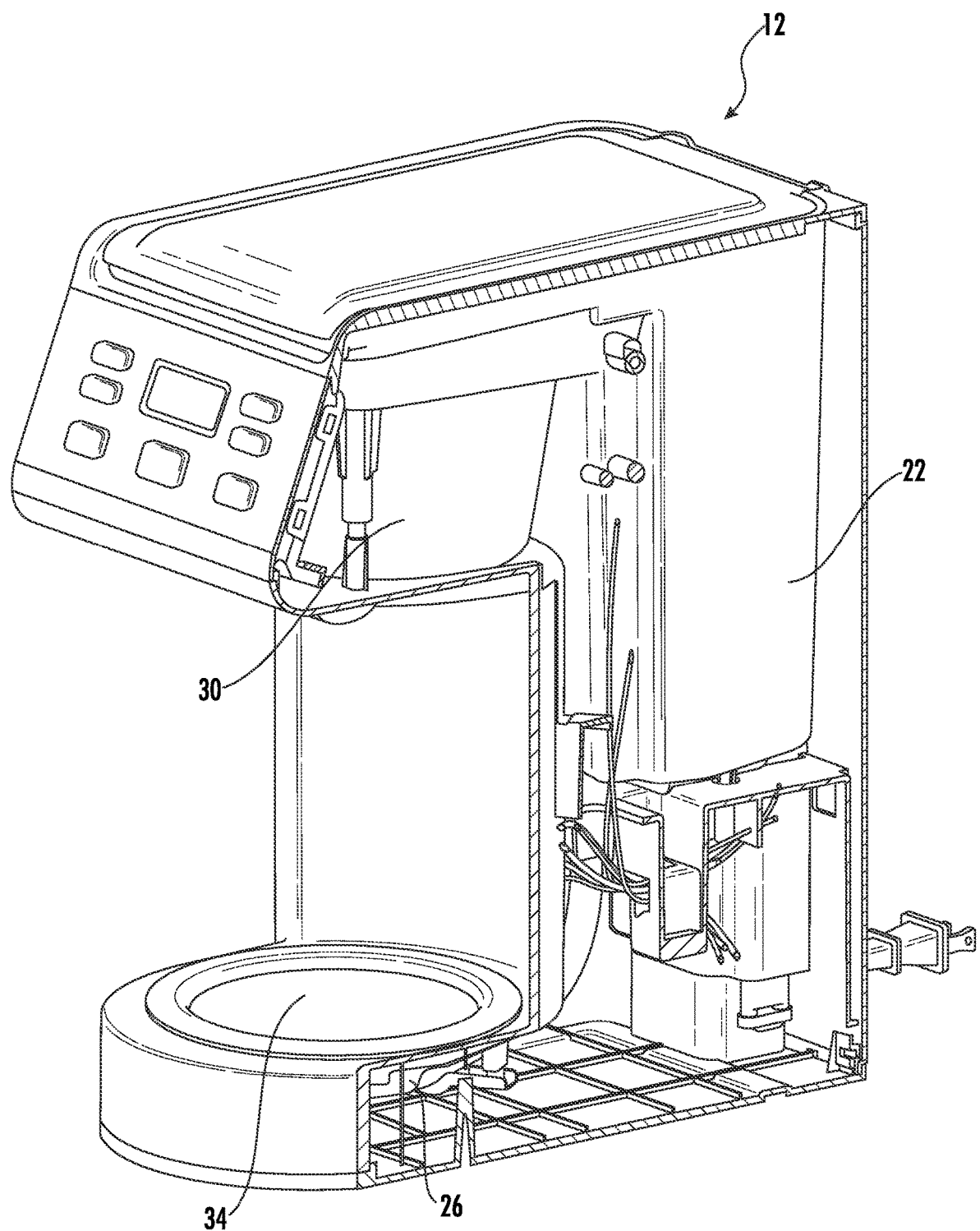
FIG. 2 is a perspective section view of the large serving station of the coffeemaker of FIG. 1.
Figure 3:
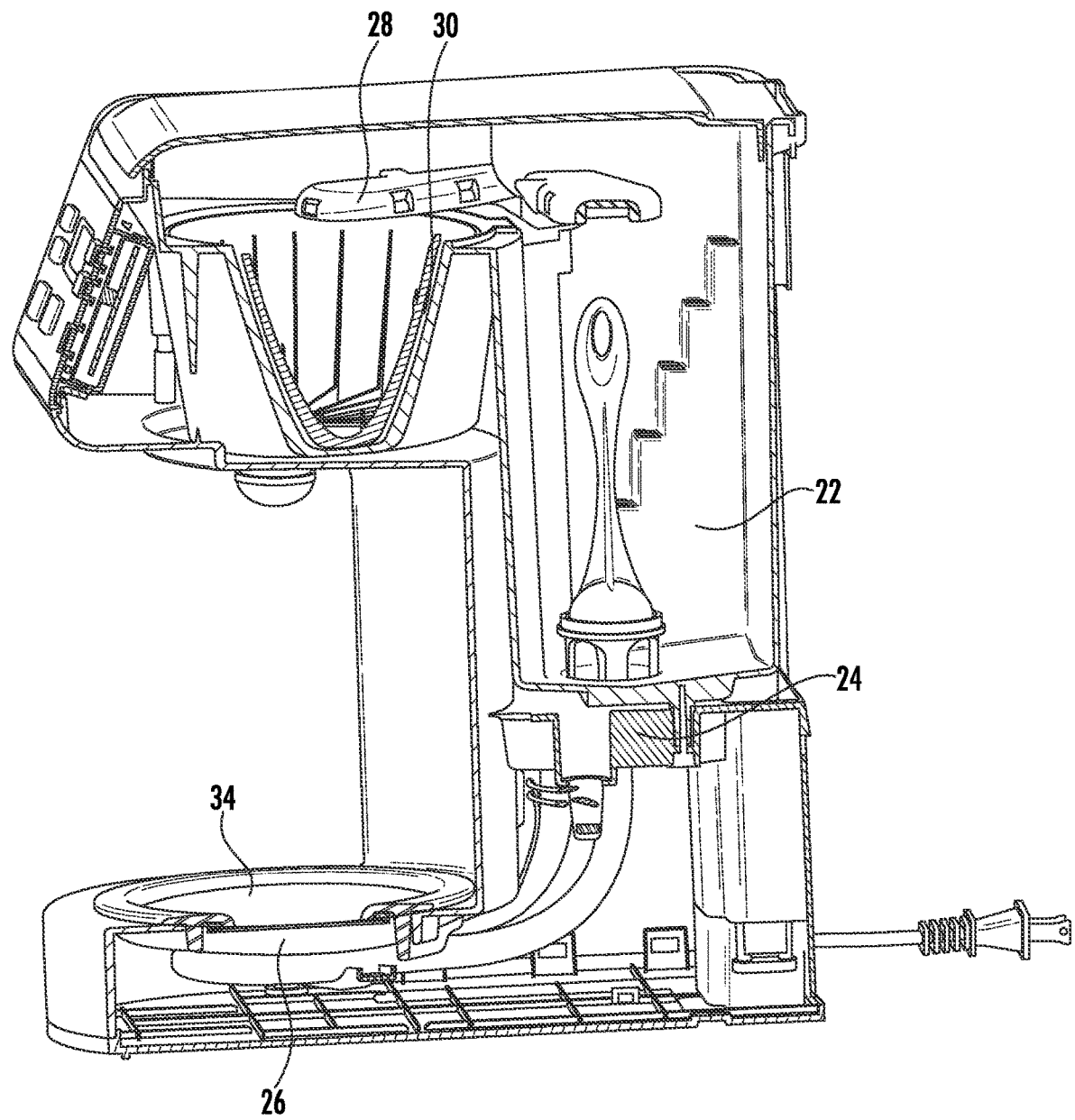
FIG. 3 is a side section view of the large serving station of FIG. 2.
Figure 4:
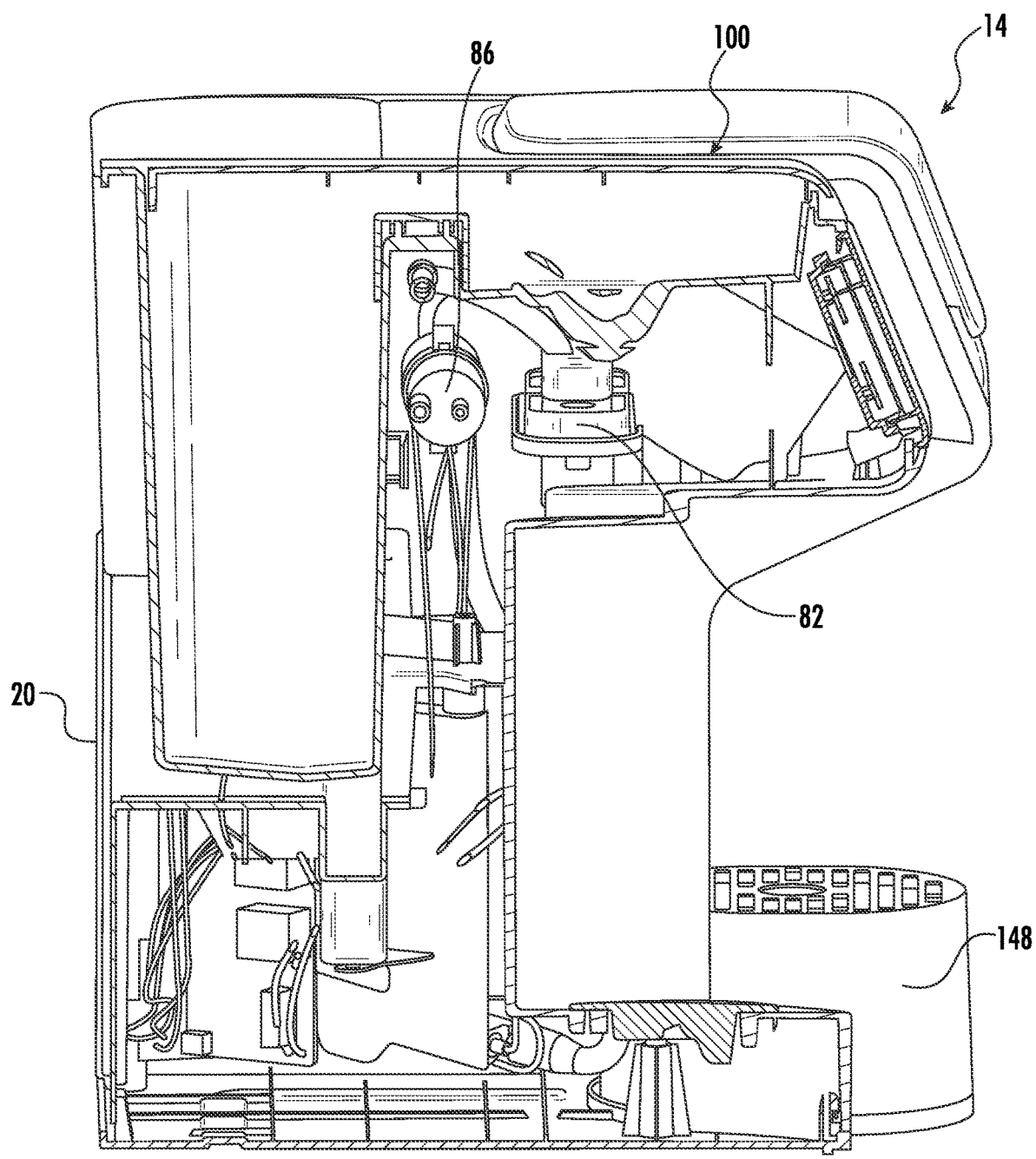
FIG. 4 is a side section view of the small serving station of the coffeemaker of FIG. 1.

Referring to FIGS. 1-3, the large serving station 12 includes separate components for brewing from the small serving station 14. These include a water reservoir 22, a pump 24, a heater 26, an outlet nozzle 28, and a brew basket 30. Grounds are positioned into the brew basket 30, and water is routed from the reservoir 22 through the pump 24, the heater 26, the outlet nozzle 28, and the brew basket 30 into a pot 32 or other container resting a platform 34 of the large serving station 12. These components may be conventional and need not be described in detail herein; an exemplary large serving station is illustrated and described in, for example, U.S. Pat. No. 9,585,513, the disclosure of which is hereby incorporated herein in its entirety. Typically the large serving station 12 may configured to brew between about 20 and 70 ounces of a beverage.

Referring now to FIGS. 4-8, the small serving station 14 is shown therein. The small serving station includes a water reservoir 40 that is mounted on the upper rear portion of the housing 20. The water reservoir 40 may be detachable for easy filling. The water reservoir 40 may also be transparent to enable a user to discern the fill level. In some embodiments the water reservoir 40 may include a water filter 42 (often as a removable insert within a holder). At its lower end, the water reservoir 40 has an outlet 46 that feeds into a fitting 48. The fitting 48 includes a spring-loaded seal that can prevent leakage through the outlet 46 when water is not being pumped through the outlet 46.

A hose 52 leads from the fitting 48 to a cold water pump 54. The cold water pump 54 is combined within a single unit with a flowmeter 56. The flowmeter 56 is included to regulate and measure the flow rate of fluid within the small serving station 14. Typically the flowmeter 56 enables a flow rate of between about 480 and 500 cc/min. Also, typically the cold water pump 54 is a relatively low pressure pump (e.g., 0.2 to 0.6 psi).

A hose 58 leads from the flowmeter 56 to a heating unit 60. The heating unit 60 includes a hollow, elongate conduit 62 and an adjacent heating element 64 that follows the path defined by the conduit 62. The heating unit 60 is generally V-shaped (with a generous bend angle at the vertex), and is generally vertically oriented such that the conduit 62 and heating element 64 gradually rise in elevation from the lower end 66 (where the hose 58 is attached to the conduit 62) and the upper end 68.

The conduit 62 is typically formed of a metallic material, such as aluminum. The heating element 64 may be formed of any number of materials, including nichrome alloys. While shown as a single heating unit 60, in some embodiments the conduit 62 and heating element 64 may be presented as separate and distinct components.

A hose 80 is connected with the conduit 62 at the upper end 68 of the heating unit 60. The hose 80 leads to a generally horizontal accumulator 82, which has an internal cavity that serves as a reservoir for heated water. A hose 84 is routed from the accumulator 82 to a second, higher pressure hot water pump 86. In addition, a venting line 88 leads from the accumulator 82 into an internal space within the multi-serving station 12. A line 90 (see FIG. B) is routed from the hot water pump 86 to a small serving brew basket 100 (described in greater detail below).

Figure 5:
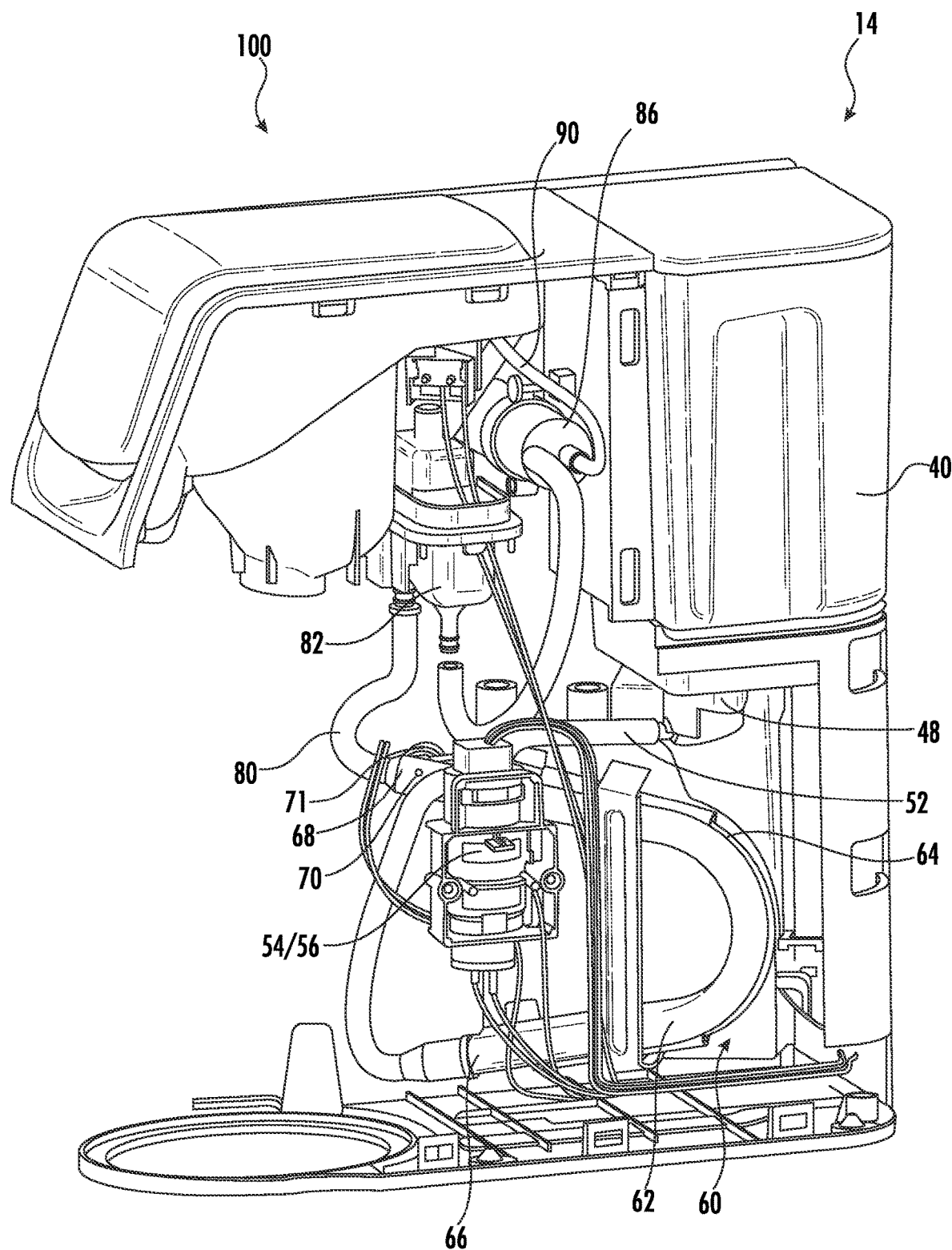
FIG. 5 is a partial side perspective view of the small serving station of FIG. 1 with the side wall removed.
Figure 6:
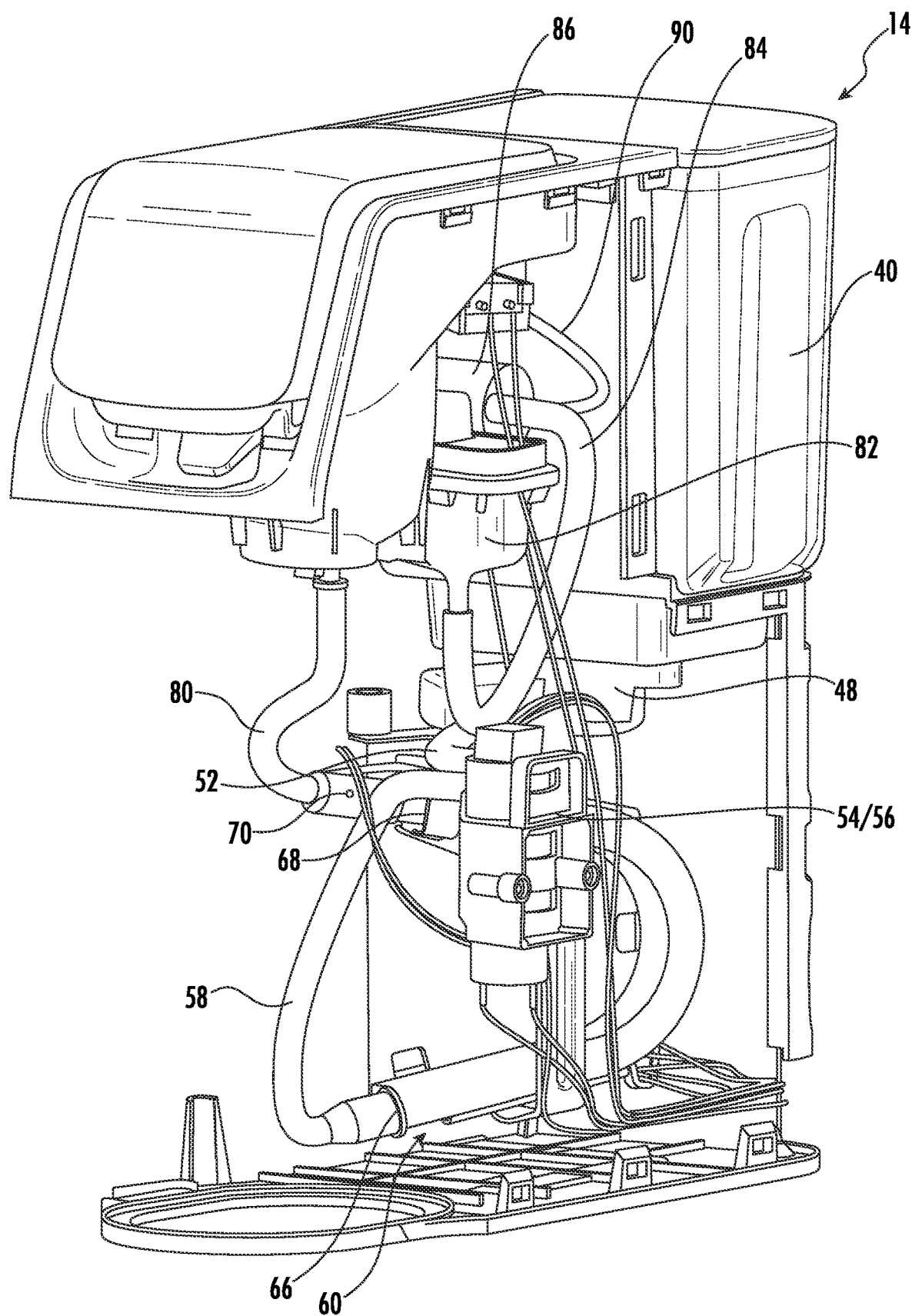
FIG. 6 is a front perspective section view of the small serving station of FIG. 5.
Figure 7:
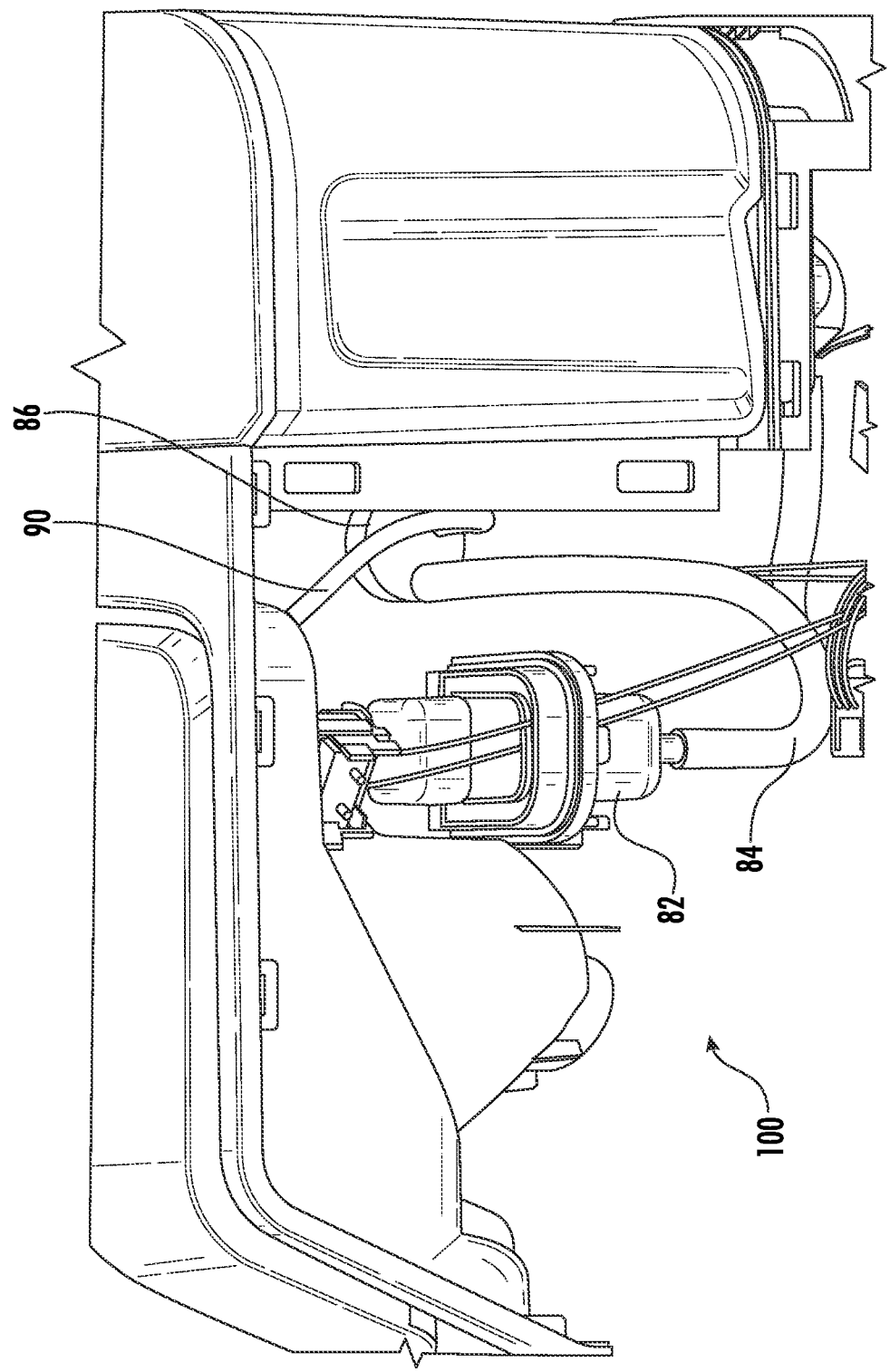
FIG. 7 is an enlarged partial side perspective view of the hot water pump and accumulator of the small serving station of FIG. 5.

Referring to FIGS. 5 and 6, two negative temperature coefficient thermistors (NTCs) 70, 71 are mounted adjacent the upper end 68 of the heating unit 60. More specifically, the NTC 71 is positioned outside of the heating unit 60 and measures the temperature of the heating element 64. The NTC 70 is located within the conduit 62 or the hose 80 and is positioned to detect the temperature of water as it leaves the heating unit 60 and travels into the hose 80. The NTCs 70, 71 may be of conventional construction and need not be described in detail herein; an exemplary NTC is Model No. KPD-EX224-U19026, available from Shenzhen Kepenga Elecronics, Ltd. The NTCs 70, 71 are electrically connected with the controller 200, which is in turn connected with the cold water pump 54. Signals from the NTC 70 are employed via the controller 200 to regulate the speed of the cold water pump 54.

Figure 8:
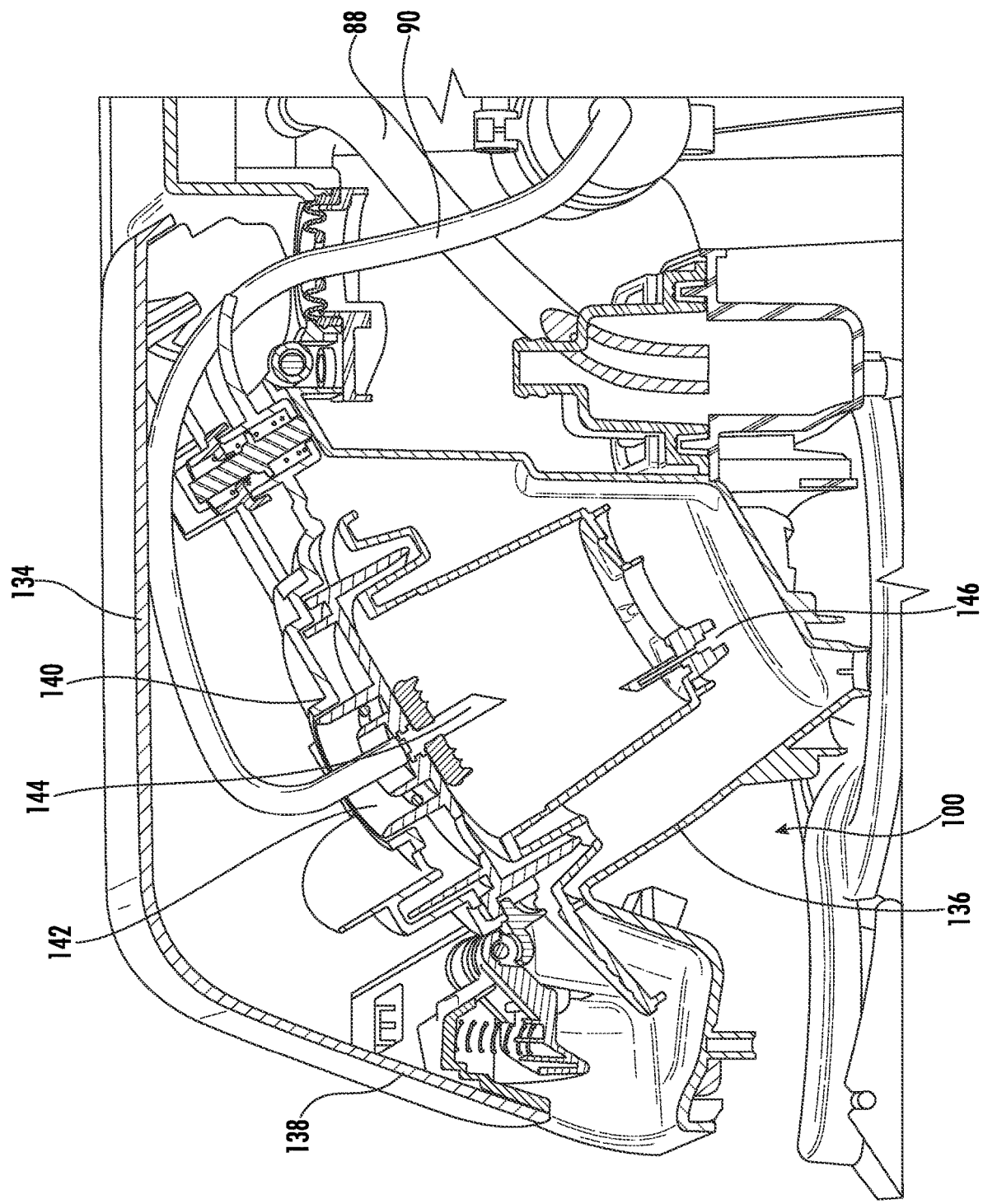
FIG. 8 is a side section view of the brew basket of the small serving station of FIG. 5.

Referring now to FIG. 8, the brew basket 100 of the small-serving station 14 is shown therein. The brew basket 100 depends from a foundation 136 and is mounted beneath a pivoting lever 134. The lever 134 has an outer cover 138 and an inner cover 140 that form a hollow cavity. A fitting 142 is mounted in the inner cover 140; the fitting 142 is in fluid communication at one end with the line 90 and at the opposite end with a hollow needle 144 that extends into the brew basket 100 and serves as the inlet thereto. An outlet 146 extends from the bottom surface of the brew basket 100. A receptacle platform 148 is positioned below the outlet 146 of the brew basket 130 (see FIG. 4).

Notably, the brew basket 100 may be configured so that it is "dual-brewing," meaning that it can receive either loose grounds of coffee (either in a filtering packet or loose in a filter) or a coffee pod. If a coffee pod is to be used, typically a pod insert or adapter is positioned within the brew basket 100, with the pod placed therein. The insert or adapter typically includes structure, such as hollow needle in its base, that can pierce or puncture the pod at or near the lower end to provide an outlet therefrom. If loose grounds are to be brewed, another adapter configured to brew loose grounds or a packet containing same may be positioned in the brew basket 100. Such an adapter typically includes porous "filter" sections that enable water to drain therefrom while retaining coffee in the brew basket 100. In either event, the adapter and the inner cover 140 form a brew chamber. An exemplary dual-brewing arrangement of this type is discussed in U.S. Patent Publication No. 2014/

0208952 to Starr et al., the disclosure of which is hereby incorporated herein in its entirety.

In operation, a user fills the water reservoir 40 with water. The user inserts either loose grounds (typically within a filter or packet, and in many instances with an accompanying adapter such as one of those described above) or a pod (typically with another of the adapters described above) into the brew basket 132 while the lever 134 is pivoted to a raised position. The lever 134 is then pivoted to a lowered position; if a pod is employed, lowering of the lever 134 causes the needle 144 to puncture the upper surface of the pod, and the aforementioned blade on the adapter to pierce the lower front edge of the pod. The user also places a cup or other receptacle on the receptacle platform 148.

The user then depresses one of the buttons on the control panel 202 to initiate brewing. Depression of a button signals the controller 200 to activate the heating element 64 of the heating unit 60. Depression of the button also activates the cold water pump 54, although activation of the cold water pump 54 may lag the operation of the heating unit 60 by a short time period (this is discussed in greater detail below). Water is drawn from the water reservoir 40 through the fitting 48 and the hose 52 into the cold water pump 54 and the flowmeter 56. Water exits the flowmeter 56 at a desired flow rate and flows through the hose 58 into the conduit 62 of the heating unit 60.

As the water travels through the conduit 62, it is heated by the heating element 64. The water is heated to a desired temperature (e.g., 190-205° F.) within the conduit 62. The heated water exits the conduit 62 and enters the lower end of the hose 80. As the water passes the NTC 70, the NTC 70 detects the temperature of the water and sends signals to the controller 200. Based on the temperature detected by the NTC 70, the controller 200 may increase or decrease the speed of the cold water pump 54 in order to ensure that the water exiting the heating unit 60 is at the desired temperature.

Notably, the configuration and orientation of the heating unit 60 can improve the accuracy of the temperature measurement taken by the NTC 70, which measures the temperature of the water exiting the heating unit 60. More specifically, when water traveling through the conduit 62 of the heating unit 60 is heated by the heating element 64, some of the water has a tendency to be converted into steam, particularly if air bubbles are present in the water. If such conversion to steam occurs, and the fluid passing the NTC 70 is a mixture of water and steam, the signals of the NTC 70 to the controller 200 may not be accurate. Stated differently, the NTC 70 measurements are most accurate when the NTC 70 is flooded with water, and less accurate when steam is present with the water. In fact, the presence of steam can cause the NTC 70 to provide signals to the controller 200 that indicate that the temperature is lower than it actually is, and therefore signal the cold water pump 54 to decrease its speed. Lower pump speed causes the water to remain in the heating unit 60 longer, which in turn causes the water to be heated even more. Thus, preventing the conversion of water to steam in the heating unit can be advantageous.

Because the conduit 62 of the heating unit 60 is oriented so it is monotonic (i.e., it constantly increases in elevation as it is routed from its lower end, without decreasing in elevation during this routing), the tendency of the water therein to produce air bubbles, and therefore to turn to steam, is decreased, if not eliminated altogether. As a result, the temperature measurements taken by the NTC 70 may be more accurate, resulting in better feedback to the cold water pump 54 (and therefore more efficient operation).

Those of skill in this art will appreciate that the heater unit 60 may take other forms in which the water path is substantially constantly increasing in elevation. For example, the conduit may take a spiral or helical form, a serpentine form, a rectilinear form, or other shapes.

In addition, it is noteworthy that the NTC 70 is positioned directly adjacent the outlet of the heater unit 60. Such positioning can provide particularly accurate information on the temperature of the water as it exits the heater unit 60. In some embodiments, the NTC 70 may be positioned between about 0 and 1 inch from the end of the heater unit 60, and in particular may be positioned between about 0 and 0.5 inch from the end of the heater unit 60.

Water exiting the heater unit 60 flows in the hose 80 to the accumulator 82. From there, water is drawn by the hot water pump 86 to and through the pump 86, then into the line 90, through which the water travels to the brew basket 100. Water flows through the line 90 into and through the needle 144 into the brew basket 132. Brewed coffee drains from the brew basket 100 through the outlet 146 into the cup or other receptacle on the receptacle platform 148.

In some embodiments, the hot water pump 86 may continue to operate after water has ceased to flow. This action can help to dry out grounds still present in the brew basket 100 (either in a pod or as loose grounds), which can help to prevent dripping from the outlet 146 after brewing.

The venting line 88 from the accumulator 82 can prevent overpressuring of the system (e.g., if the needle 144 were to become clogged with coffee grounds). The venting line 88 can also prevent any back pressure from drawing coffee grounds back through the needle 146 and into the system, which might otherwise happen if the user interrupted the brew cycle by opening the brew chamber prior to turning the unit off.

Those skilled in this art will appreciate that the coffeemaker 10 may take other forms. For example, the small serving station 14 may take a different form; for example, rather than being configured to receive and process either pods or loose grounds, it may be configured to receive and process only one or the other. Also, the small serving station 14 may have a different mechanism for holding and/or piercing the pod. Other variations may also be suitable for use herein.

Figure 11:
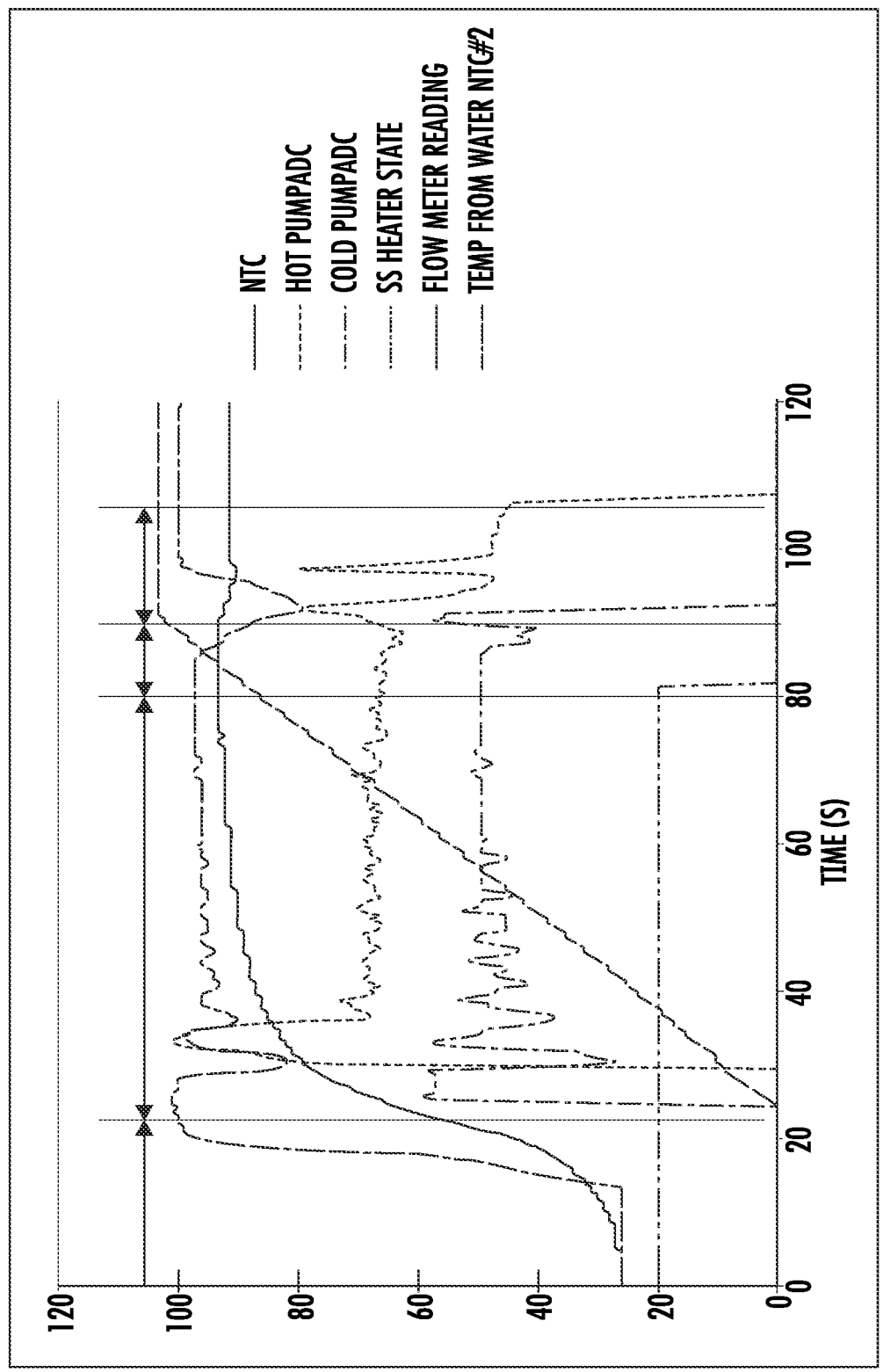
FIG. 11 is a graph illustrating operations of the small serving station of FIG. 5.
Figure 12:
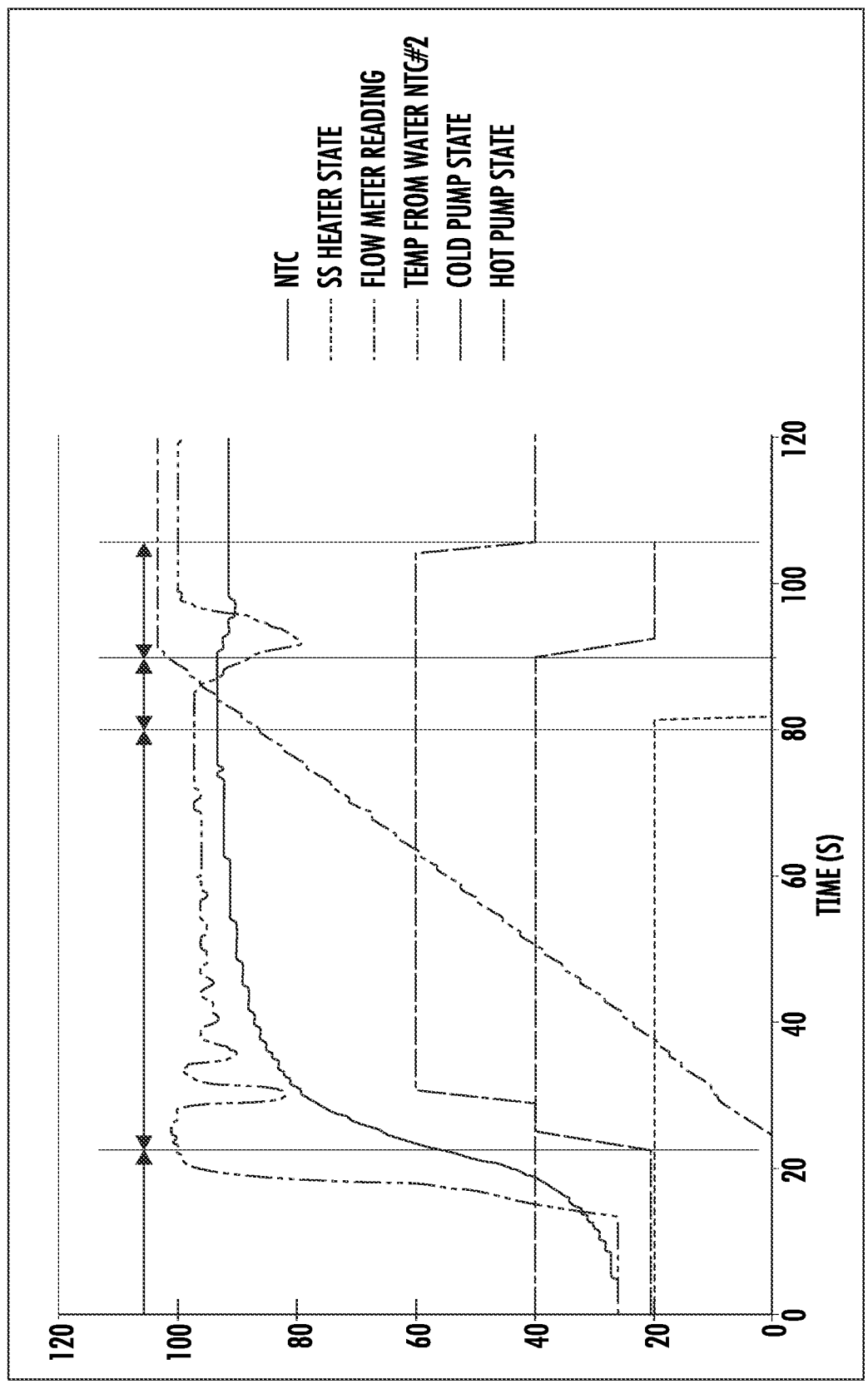
FIG. 12 is a graph further illustrating operations of the small serving station of FIG. 5.

The specifics of the timing of the brewing cycle are shown in FIGS. 11 and 12. More specifically, activation of the coffeemaker 10 activates the heater element 64. Typically, residual water from previous brewing remains in the conduit 62 and is heated during this period. After a short duration to allow the heating element 64 to heat up (e.g., 15 seconds), the cold water pump 54 is activated and conveys water from the reservoir 40 through the heating unit 60 (where it is heated) and into the accumulator 82. The NTC 70 provides feedback regarding the temperature of the water to the cold water pump 54 (via the controller 200), thereby regulating its speed to produce water of the desired temperature.

After another short duration (e.g., 0-5 seconds), the hot water pump 86 is also activated and begins to convey heated water from the accumulator 82 to the hot water pump 86 itself, then to the brew basket 100. The pumps 54, 86 continue to operate for a longer duration (e.g., 30-80 seconds), with the speed of the cold pump 54 controlled by feedback from the NTC 70. As water is flowing through the pump 54, the flowmeter 56 monitors the flow therethrough.

When the flowmeter 56 measures that a certain predetermined remaining volume from the target volume of water for the serving size has been conveyed, the flowmeter 56 signals the controller 200 to deactivate the heating unit

60. For the duration until the target volume is reached (e.g., 10-15 seconds), the pumps 54, 86 continue to operate. During this period, the temperature of the water exiting the heating unit 60 decreases slightly (this can be seen in the water temperature plot in FIGS. 11 and 12—typically the decrease in temperature is between about 2 and 25 degrees C.). When the flowmeter 56 detects that the target volume has passed through the flowmeter 56, the cold water pump 54 deactivates. However, the hot water pump 86 continues to operate, and does so even after all of the water needed for the brewing has passed through the hot water pump 86 in order to dry out the wet grounds in the brew basket 100. As the available water is depleted, residual heat in the heating unit 60 can cause water in the heating unit 60 to heat up and convert to steam. Having pressurized steam pumped from the hot water pump 86 can be undesirable for multiple reasons. Thus, by reducing the temperature of the water by deactivating the heating unit 60 prior to reaching the target volume, the tendency of the water being pumped from the hot water pump 86 to the brew basket 100 to convert to steam is reduced or eliminated.

Figure 13:
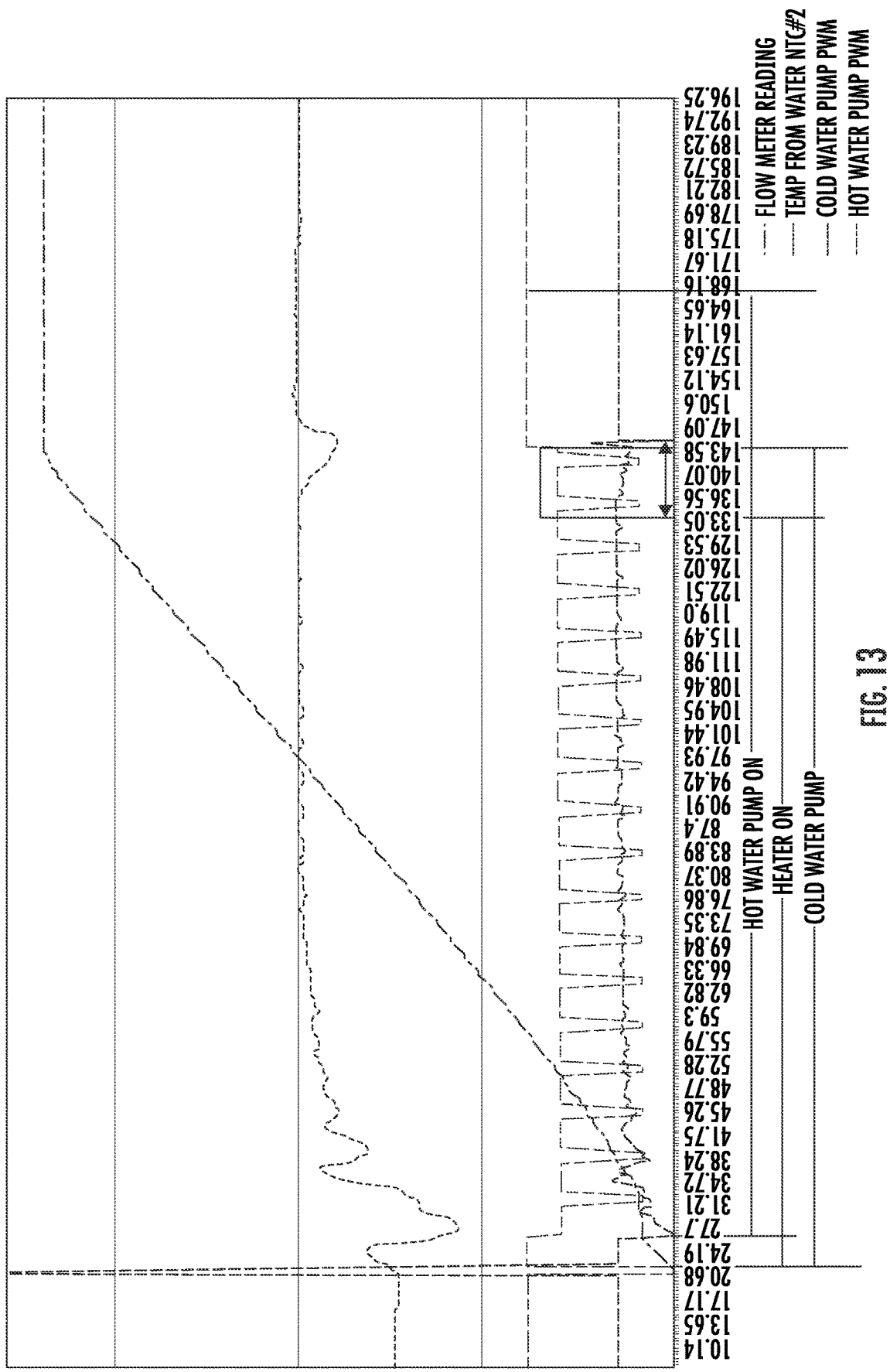
FIG. 13 is a graph illustrating alternative operations of the small serving station of FIG. 5.

Referring now to FIG. 13, operations for producing a "bold" brew are illustrated. For a "bold" brew, rather than operating at generally the same speed, the hot water pump 86 operates with a "pulsing" pattern, wherein the pressure is increased, then decreased, repeatedly (this is shown in FIG. 13, wherein the "hot water pump" line indicates the repeated rising and falling of the pressure of the hot water pump 86). Such a pulsing pattern can have the effect of releasing more of the flavor from the coffee grounds, thereby producing a beverage with a "bolder" flavor. Nonetheless, for a "bold" brew the sequence of activation and deactivation remains the same as described above: the heating unit 60 is deactivated as the cold water pump 54 and hot water pump 86 continue to operate (this is shown by the two-arrowed line in FIG. 13), and the cold water pump 54 is deactivated as the hot water pump 86 continues to operate.

Those of skill in this art will appreciate that the coffeemaker 10 may take other forms. For example, the coffeemaker may have only the components of the small serving station 14 and lack a large serving station altogether. Also, the small serving station 14 may be configured to brew servings of higher or lower volume than that shown.

In addition, the coffeemaker 10 may include a different manner of venting from the hot water pump 86. For example, a pressure-relief valve may be employed. Moreover, in some embodiments the coffeemaker 10 may rely solely on the cold water pump 54 for conveying water to the brew basket 100, and lack the accumulator 82 and hot water pump 86 entirely.

As a further alternative, the coffeemaker 10 may employ a different temperature sensor than the NTCs 70, 71 discussed above. Also, in some embodiments the NTC 71 (which detects the temperature of the heating unit) may be omitted.

Further, the coffeemaker 10 may employ different means for activating and deactivating components during the brew cycle. For example, the deactivation of the heating unit 60 may be regulated based on a pre-determined time, or on a fluid level in the reservoir, rather than on the flowmeter reading. Similarly, the deactivation of the cold water pump 54 and/or the hot water pump 86 may be regulated via time or the temperature level detected by the NTC 70, and/or the cold water pump 54 deactivation may be regulated by the flowmeter reading. Other possibilities will be apparent to those of skill in this art.

Figure 9:
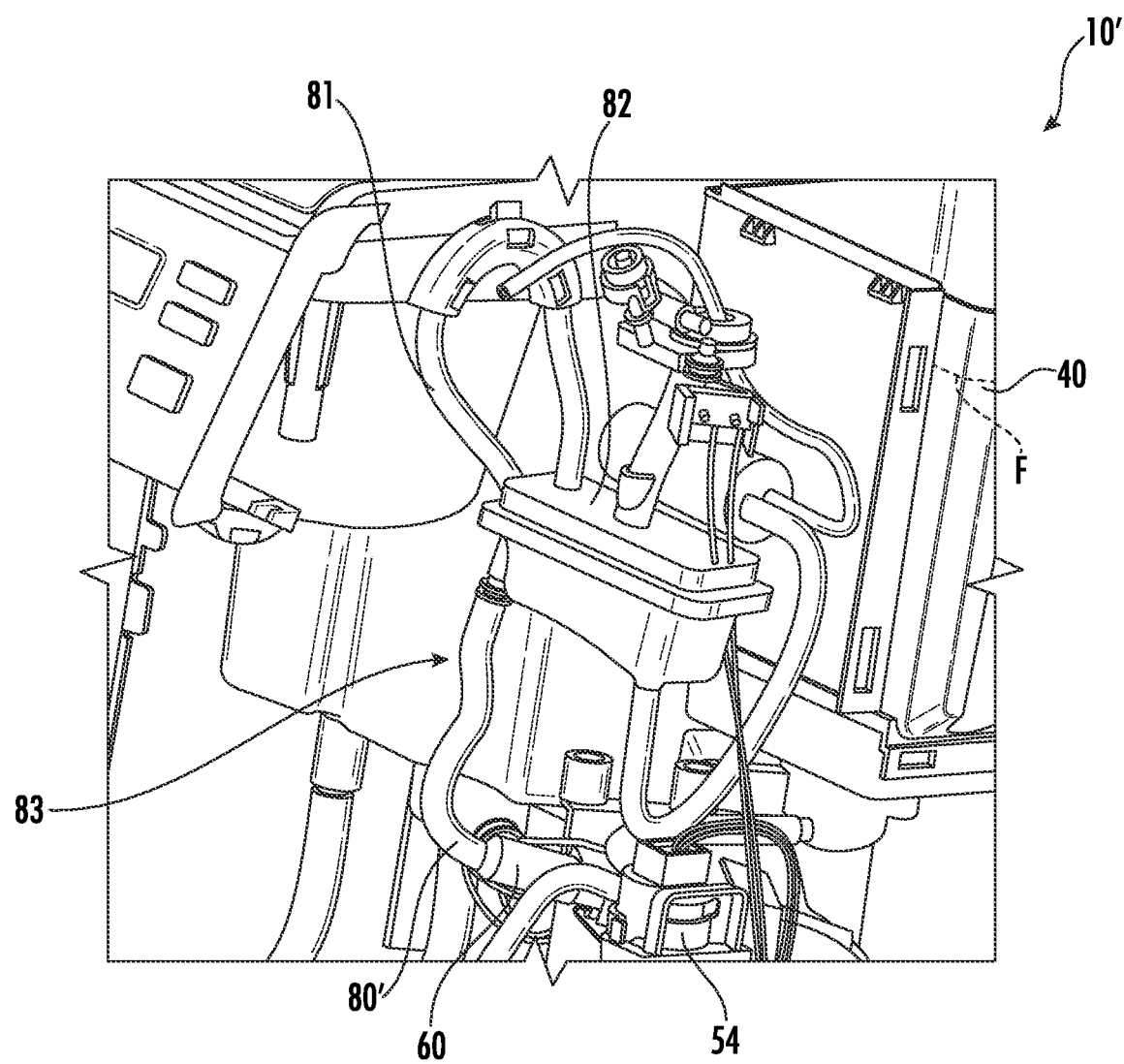
FIG. 9 is an inside partial perspective view of a multi-functional coffeemaker according to alternative embodiments of the invention.
Figure 10:
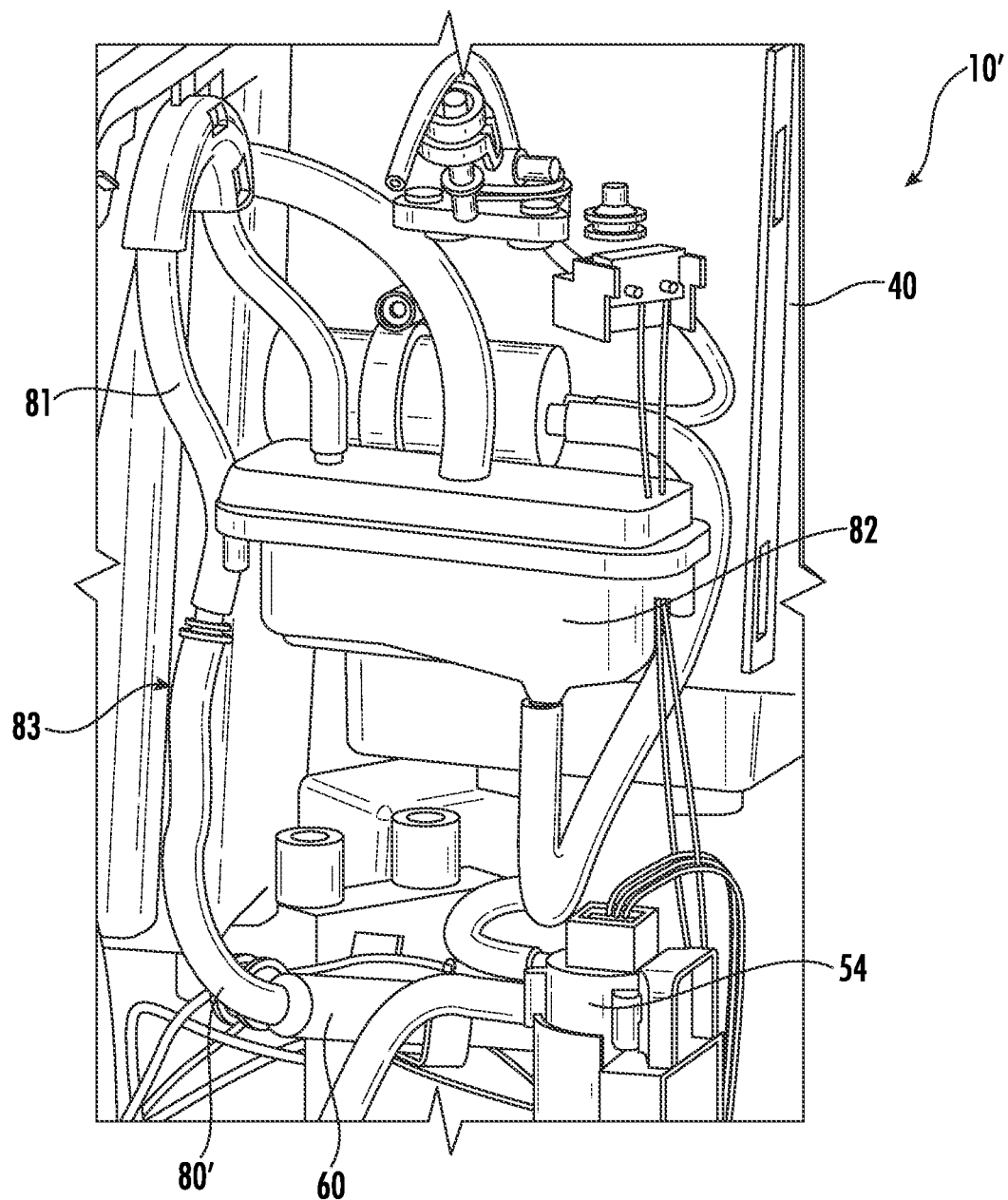
FIG. 10 is a side partial perspective view of the coffeemaker of FIG. 10.

As a further alternative, a coffeemaker 10' is shown in FIGS. 9 and 10. The coffeemaker 10' is similar to the coffeemaker 10, with the exception that the hose 80' that exits the heating unit 60 is routed to a hose 81, which is itself routed to the accumulator 82. The hose 80' and the hose 81 form a conduit 83 that follows a path that rises from the heating unit 60 to an elevation that about equals or exceeds that of the fill line F of the water reservoir 40 (see FIGS. 9 and 10), then descends to enter the accumulator 82 from above.

The inclusion of the conduit 83 can provide an operational assurance feature for the coffeemaker 10'. In the configuration of the coffeemaker 10, if there is leakage in the cold water pump 54 when the coffeemaker 10 is not in use, water can leak through the cold water pump 54, through the heating unit 60, through the hose 80, and into the accumulator 82. This action would be gravimetrically driven by the pressure head created by water in the water reservoir 40; a leaking cold water pump 54 would allow cold water to travel into the accumulator until the water level reached that of the water level in the water reservoir 40. As a result, when the coffeemaker 10 is switched on again, the accumulator 82 would be filled with cold water, which would used to brew the next serving of coffee. Thus, if as an example a user filled the water reservoir 40 with water and left the water reservoir 40 filled without operating the coffeemaker for a prolonged interval (e.g., overnight), the first serving of coffee prepared when the coffeemaker was next operated would contain a significant amount of cold water. The configuration of the coffeemaker 10' addresses this potential issue. If the cold water pump 54 were to leak, water would only travel through the conduit 83 to a level equal to an elevation equal to that of the water level in the water reservoir 40, as at this level the head pressure on both the water in the water reservoir 40 and the conduit 83 would be the same. Thus, even if the water reservoir were filled to the fill line F, the cold water would not reach the accumulator 82, as the highest elevation of the conduit 83 is higher than the fill line F. When the coffeemaker was next used, only the small amount of water in the heating unit 60 and the "rising" portion of the conduit 83 would be cold, and this amount is insignificant compared to the overall amount of water in a serving. As such, the conduit 83 acts like a check valve for the system.

This configuration may also help to prevent any water from being converted to steam as discussed above.

Those of skill in this art will appreciate that the effect of the conduit 83 may take other forms. As one example, the hose 80' and hose 81 may be combined into a single hose that serves as the conduit 83. As another example, the hose 52 from the fitting 48 to the cold water pump 54 may be routed to have a highest elevation that is about equal to or exceeding the fill line of the water reservoir 40; such a configuration would achieve the same effect of preventing cold water leaking through the cold water pump 54 from reaching the accumulator 82 (in this instance, the cold water would not reach the cold water pump 54 at all). Other configurations may also be contemplated.

In other embodiments, the sequence of heating the water and operating the pumps may vary. For example, the coffeemaker 10 may be configured to pre-heat the water prior to the "brew button" (e.g., the "start" or "on" button/switch/panel) being actively actuated. Preheating of water in coffeemakers is common in large commercial devices or urns (such as "pour-over" coffeemakers often employed in restaurants), wherein a tank is heated when the coffeemaker is turned on, which enables the coffeemaker to begin brewing immediately when the consumer presses "brew." On a typical single serve device, pressing the "on" button heats water in a tank, which is then conveyed through the system for brewing only after it is heated.

In contrast, the coffeemaker 10 may be configured to begin the heating process based on detecting that one or more actions have been taken by the consumer that are typically performed prior to initiation of brewing on the small serving station 14. Instead of the coffeemaker 10 beginning to heat water only after the consumer presses a "brew" button, the coffeemaker 10 may be configured to activate the heating unit 60 responsive to the controller 200 detecting that the consumer has performed a "pre-brewing" action, such as opening the lever 134 to insert loose grounds or a coffee pod, adding water to the water reservoir 40, pushing any button on the unit to select brew strength, brew volume or the like, placing a mug or receptacle on the platform 148, etc. Thus, the coffeemaker 10 may be preheated "intuitively" (in the sense that these "pre-brewing" actions by the consumer are typically followed shortly thereafter by brewing, and therefore the coffeemaker 10 "intuits" that brewing will begin shortly and begins to heat the heating unit 60).

In the embodiment of the coffeemaker 10 illustrated herein, the heating unit 60 may require only a relatively short time (e.g., 1-25 seconds, in some instances 1-10 seconds) to reach a desired pre-determined temperature (e.g., 50 to 90° C., and in some embodiments 70-90° C.). Thus, by the time the consumer has set up the coffeemaker 10 and pressed "brew," in many instances the heating unit 60 is sufficiently heated that brewing can commence quite soon, thereby saving overall brewing time. (In the event that the consumer takes longer than a predetermined period, such as 30 minutes, the heating unit 60 will deactivate).

As is described above, the heating unit 60 is a "flow-through"-style (as opposed to a heating unit that heats a tank or reservoir of water). Typically, a flow-through heater would not be preheated because in such heaters steam pressure can build up in the heater that forces the water forward in the system. Preheating to operating temperature may prematurely force water through the unit before the consumer is ready. In the coffeemaker 10, the cold water pump 54 is employed to pump water through the heating unit 60 at various rates to control temperatures. Nevertheless, given the relatively small mass of water to be heated and the small mass of the heating unit 60 itself, preheating can be rapid and, if the water becomes too hot (and in some instances turns to steam), it may move forward in the system before the consumer is ready.

This potential issue is addressed in the coffeemaker 10 via control of the cold water pump 54 and the heating unit 60. As described above, the heating unit 60 is preheated based on one of the "intuitive" steps described above; however, heating of the heating unit 60 is controlled (via measurements taken by the NTCs 71, 72 and controlled through the controller 200) so that steam is not created in the heating unit 60. When the consumer pushes the brew button to initiate brewing, the cold water pump 54 turns on momentarily. The cold water pump 54 then pauses while the heating unit 60 heats the water further to brewing temperature (e.g., 50 to 90° C.), then resumes pumping at varied power levels in the manner described above until brewing is complete. This operation is referred to herein as "priming" of the heating unit 60.

Figure 14:
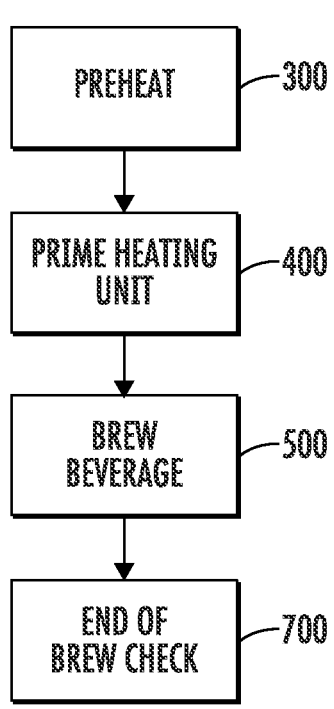
FIG. 14 is a flow chart illustrating exemplary overall operations of the coffeemakers of FIGS. 1 and 9.

Exemplary operational control logic of the coffeemaker 10 (and more specifically, the controller 200 thereof) is illustrated in the flow charts of FIGS. 14-19. As shown in FIG. 14, the general processes may include preheating (Operation 300 and FIG. 15), priming of the heating unit (Operation 400 and FIG. 16), brewing (Operation 500 and FIG. 17), and conducting an "end-of-brew" termination check (Operation 700 and FIG. 19). These operations are described in greater detail below.

Figure 15:
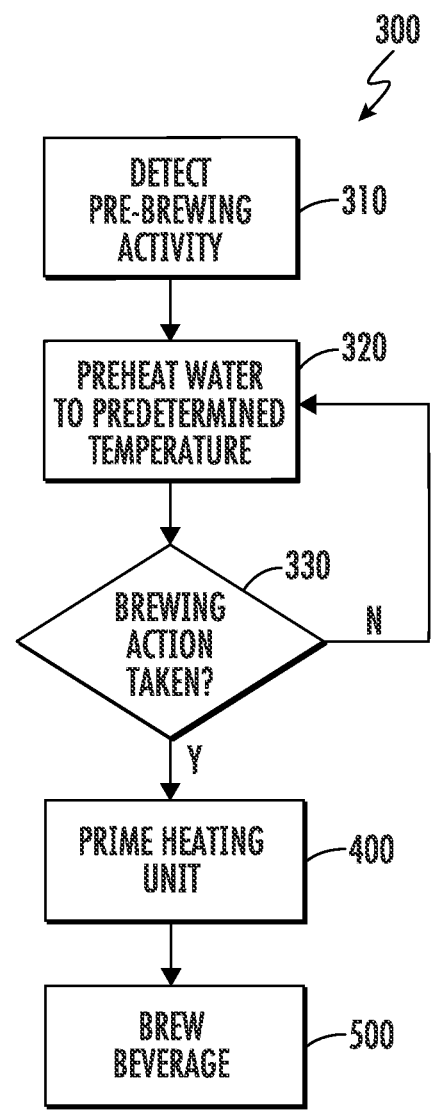
FIG. 15 is a flow chart illustrating exemplary preheating operations of the coffeemakers of FIGS. 1 and 9.

Referring first to FIG. 15, as noted above, the preheating process is initiated based on detection of one or more of the "intuitive" pre-brewing activation events, such as opening the lever 134 to insert loose grounds or a coffee pod, adding water to the water reservoir 40, placing a mug on the platform 148, pushing any button on the unit to select brew strength, brew volume or the like, etc. (Block 310). The heating unit 60 is activated to heat the water within the heating unit 60 for a predetermined time and/or to a predetermined temperature (e.g., between 70 and 90° C.), with the goal of increasing the temperature of the water without creating steam (Block 320). In Block 330, the coffeemaker 10 detects whether the user has activated brewing, for example by pressing the "brew" button. If the user has not yet activated brewing, the heating unit 60 maintains the water at the predetermined temperature ("N" branch from Block 330), which may involve intermittently activating and deactivating the heating unit 60 (e.g., for 1-10 second intervals) to maintain the water within a desired temperature range. Such activation and deactivation may be triggered by the temperature detected by one or both of the NTCs 71, 72.

If the user has activated brewing ("Y" branch from Block 330), the coffeemaker 10 proceeds to heating unit and priming and brewing (Operations 400 and 500). In some embodiments, operation 300 may include starting a timer during block 320, once the water has been heated to the pre-determined temperature, and block 330 may include detecting that the user has not activated brewing prior to expiration of the timer or that the timer has exceeded a predetermined threshold value (e.g., 30 minutes), which may result in the controller 200 deactivating the heating unit 60.

Figure 16:
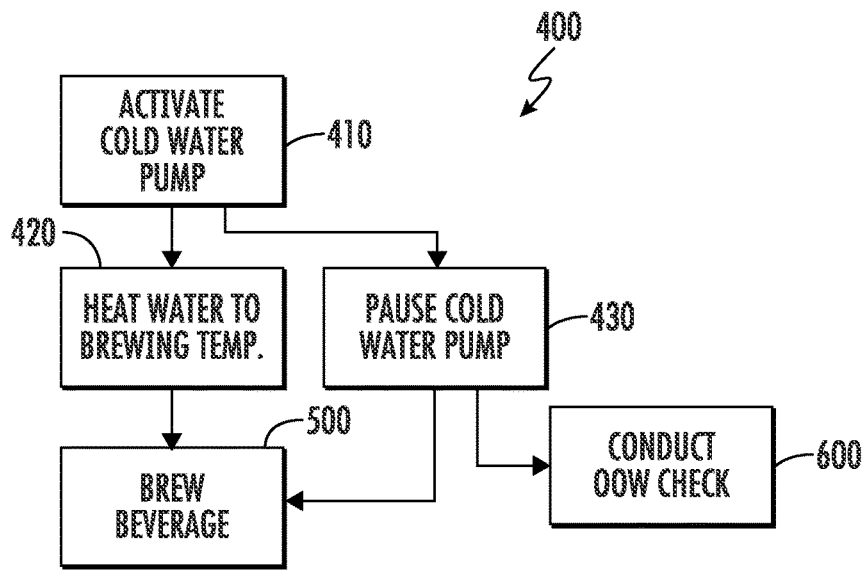
FIG. 16 is a flow chart illustrating exemplary heating unit priming operations of the coffeemakers of FIGS. 1 and 9.

Referring now to FIG. 16, the activation of brewing (Block 330 above) initiates the priming of the heating unit 60 (Operation 400). This operation commences with the activation of the cold water pump 54 (Block 410), which turns on briefly, then pauses (Block 430) while the heating unit 60 continues to heat water to brewing temperature (Block 420). During priming, an "out of water (OOW) check" is conducted (this is discussed in greater detail in connection with FIG. 18 below and is broadly illustrated here at Operation 600). When, under the conditions discussed below, the OOW check does not determine an absence of water, the cold water pump 54 remains paused for a predetermined time and/or until the heating unit 60 has reached brewing temperature (Block 430), at which point brewing commences (Operation 500).

In some embodiments, the priming of the heating unit 60 may be preceded by a short check (typically 1-2 seconds) to determine whether residual water is already present in the heating unit 60. The check involves measuring an operational parameter of the cold water pump 54 (e.g, the impedance, drive voltage, or power usage of the cold water pump 54) at a pre-determined operational level. If the detected level of the operational parameter is lower than a predetermined threshold (e.g., 50-55 percent of maximum impedance), this indicates that the heating unit 60 is not filled with residual water, and the priming process of FIG. 16 is performed. If the predetermined operational parameter threshold is met or exceeded, this indicates water is present in the heating unit 60 already, and the priming process of FIG. 16 is omitted.

Figure 17:
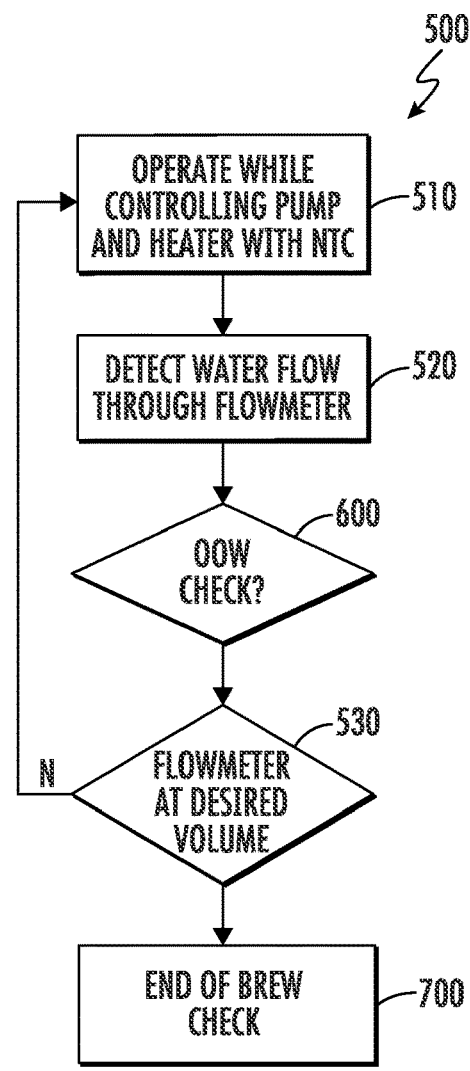
FIG. 17 is a flow chart illustrating exemplary brewing operations of the coffeemakers of FIGS. 1 and 9.

Referring now to FIG. 17, once the heating unit 60 has been primed, brewing commences (Operation 500); the operation of the cold water pump 54 is controlled by the controller 200 as discussed above based on feedback from the NTCs 71, 72 (Block 510), with the power level (PWM) of the cold water pump 54 varying based on the temperature of the heating unit 60. The system continues to conduct the OOW check (Operation 600—discussed below), and once the flowmeter 56 detects that the desired volume has been brewed (Block 530), also conducts "heater shutdown" and "end of brew" checks as part of the termination process (Operation 700, which is discussed further in connection with FIG. 19 below) once brewing is complete.

Figure 18:
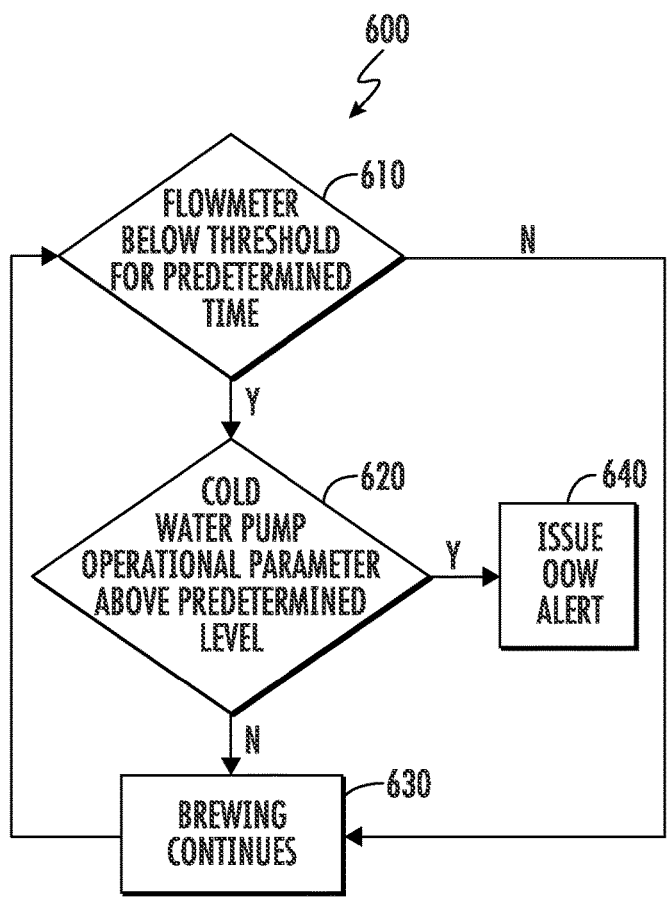
FIG. 18 is a flow chart illustrating exemplary "out-of-water" detecting operations of the coffeemakers of FIGS. 1 and 9.

Referring now to FIG. 18, the OOW check mentioned above and designated broadly at Operation 600 is illustrated. In the OOW check, the controller 200 detects whether the flowmeter count has failed to increase for a preset time interval (Block 610). If the flowmeter count has not increased for the preset time interval ("Y" branch from Block 610), then controller 200 also detects if an operational parameter of the cold water pump 54 (e.g., power or drive voltage) exceeds a certain preset value (e.g., 15 percent of full drive voltage)(Block 620). The order of operation of Blocks 610 and 620 may be reversed in some embodiments. If the flowmeter count has not increased for the preset interval and the operational parameter of the cold water pump 54 exceeds the preset value, (i.e., "Y" branch from Block 620), then the controller 200 may determine that the coffeemaker 10 is out of water and requires replenishment, and the controller 200 may pause brewing and provide an alert (Block 640). Using both assessments (i.e., stationary flowmeter reading and exceeding pump operational parameter level) may enable the controller 200 can distinguish a true "out of water" scenario (in which the cold water pump 54 is still trying to pump water that is absent) from a scenario in which the water flow has slowed because the cold water pump 54 has slowed greatly (i.e., has a low drive voltage) as part of the preheating and priming process. In some embodiments, the heating unit 60 is a relatively low mass heater, and temperature swings in the heating unit 60 may be substantial, particularly at the beginning of a brew cycle. Because operation of the cold water pump 54 depends on the temperature detected by the NTCs 71, 72, such wide temperature variation can cause pump power levels to fluctuate significantly as well. Thus, without the verification of the pump operational parameter level detected at Block 620, the system might otherwise indicate an OOW scenario every time the operational parameter level of the cold water pump 54 drops below a certain operating capacity (as it would during priming). By using both parameters to determine the absence of water, "false positives" of OOW cause by low pump operation (such as during heating unit priming) can be reduced or avoided, and brewing continues (Block 630).

Figure 19:
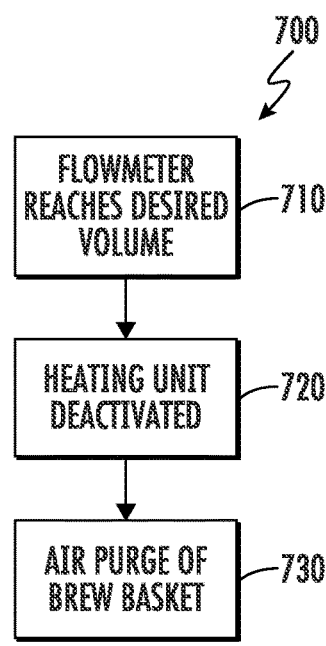
FIG. 19 is a flow chart illustrating exemplary brewing termination operations of the coffeemakers of FIGS. 1 and 9.

Referring now to FIG. 19, the "end-of-brew" termination procedure indicated broadly above at Operation 700 is illustrated. In the termination procedure, the controller 200 detects that the flowmeter measurement or "count" is greater than or equal to the target volume selected by the user (e.g., 8 ounces)(Block 710). The heating unit 60 continues to operate if the flowmeter count is less than the target volume. Once the flowmeter measurement is equal to or exceeds the target volume, the system deactivates the heating unit 60 (Block 720). The system performs an air purge of the brew basket 100 (Block 730). Once this is complete, the system recognizes that the brewing cycle has ended.

Finally, it will be recognized that, although the device is designated as a coffeemaker 10, 10', the device may be employed to brew other beverages, such as tea.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method of brewing a beverage by a beverage-making machine, the beverage-making machine comprising a housing, a controller, a fluid reservoir mounted to the housing, a pump fluidly connected with the water reservoir, a heating unit, a brew station having an outlet, and a fluid path defined by the fluid reservoir, the pump, the heating unit, and the brew station, the method comprising:
    (a) detecting, by the controller, a performance of a pre-brewing action;
    (b) initiating preheating of the heating unit responsive to the detection of the performance of the pre-brewing action; then
    (c) detecting by the controller a performance of a brew activation action that is different from the pre-brewing action; and
    (d) passing fluid from the reservoir along the fluid path to the outlet of the brew station to prepare a brewed beverage responsive to detection of the performance of the brew activation action.

2. The method defined in claim 1, wherein the pre-brewing action is selected from the group consisting of: selecting a brew strength; selecting a brew volume; manipulating the fluid reservoir; positioning a receptacle adjacent the outlet; and manipulating the brew station to add brew solids.

3. The method defined in claim 1, wherein the heating unit is a flow-through heating unit.

4. The method defined in claim 1, wherein the preheating is carried out for a predetermined duration.

5. The method defined in claim 4, wherein the predetermined duration of step (b) is between 1 and 10 seconds.

6. The method defined in claim 4, wherein the controller is configured to deactivate the heating unit if no brew activation action is taken within a second pre-determined duration.

7. The method defined in claim 1, wherein the heating unit is configured to reach an equilibrium temperature of between 50 and 90 degrees C. during preheating.

8. A method of brewing a beverage with a beverage-making machine, comprising:
    (a) responsive to detection of a performance of a pre-brewing action by a controller of the beverage-making machine, initiating, by the controller, preheating of a heating unit of the beverage making-machine, wherein the pre-brewing action is selected from the group consisting of: selecting a brew strength; selecting a brew volume;
    manipulating a fluid reservoir; positioning a receptacle adjacent an outlet of a brew station; and manipulating the brew station to add brew solids, and wherein the heating unit is preheated to an equilibrium temperature of between 50 and 90 degrees C.;

then (b) responsive to detecting of a performance of a brew activation action that is different from the pre-brewing action, passing fluid from the fluid reservoir along a fluid path to the outlet of the brew station to brew the beverage.

9. The method defined in claim 8, wherein the heating unit is a flow-through heating unit.

10. The method defined in claim 8, wherein the preheating is carried out for a predetermined duration.

11. The method defined in claim 10, wherein the predetermined duration is between about 1 and 10 seconds.

12. The method defined in claim 10, wherein the controller of the beverage-making machine is configured to deactivate the heating unit if no performance of the brew activation action is taken within a second predetermined duration.

13. A beverage-making machine, comprising:
a housing;
a fluid reservoir mounted to the housing;
a pump fluidly connected with the fluid reservoir;
a heating unit;
a brew station having an outlet;
a fluid path is defined by the fluid reservoir, the pump, the heating unit and the brew station; and
a controller, wherein the controller is configured to:
(a) detect performance of a pre-brewing action, and in response initiate preheating of the heating unit; then
(b) detect performance of a brew activation action, and in response activate the pump to convey fluid from the fluid reservoir along the fluid path to the outlet of the brew station to prepare a brewed beverage.

14. The beverage-making machine defined in claim 13, wherein the pre-brewing action is selected from the group consisting of: selecting a brew strength; selecting a brew volume; manipulating the fluid reservoir; positioning a receptacle adjacent the outlet; and manipulating the brew station to add brew solids.

15. The beverage-making machine defined in claim 13, wherein the heating unit is a flow-through heating unit.

16. The beverage-making machine defined in claim 13, wherein the controller is configured so that the preheating lasts for a predetermined duration.

17. The beverage-making machine defined in claim 16, wherein the pre-determined duration is between about 1 and 10 seconds.

18. The beverage-making machine defined in claim 13, wherein the controller is configured so that the heating unit is deactivated if no brew activation action is taken within a second predetermined duration.

19. The beverage-making machine defined in claim 13, wherein the controller is configured so that, during preheating, the heating unit reaches an equilibrium temperature of between 50 and 90 degrees C.

* * * * *